United States Patent
Brock et al.

(10) Patent No.: US 6,406,625 B1
(45) Date of Patent: Jun. 18, 2002

(54) SPRING-BIASED FILTER ASSEMBLY

(75) Inventors: Rueben Brock, Suwanee; Carl Cucuzza, Loganville; Daryl Reece, Atlanta, all of GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/702,426

(22) Filed: Oct. 31, 2000

(51) Int. Cl.[7] .......................... B01D 29/37; B01D 35/30
(52) U.S. Cl. ...................... 210/232; 210/184; 210/186; 210/452
(58) Field of Search ................................. 210/232, 452, 210/184, 186

(56) References Cited

U.S. PATENT DOCUMENTS

| | | | |
|---|---|---|---|
| 3,053,389 A | * | 9/1962 | Rosean et al. |
| 3,295,679 A | * | 1/1967 | Rosaen |
| 3,561,602 A | * | 2/1971 | Molitor |
| 3,819,052 A | * | 6/1974 | Firth |
| 3,912,630 A | | 10/1975 | Reighard et al. ............ 210/130 |
| 3,994,810 A | | 11/1976 | Schaeffer .................... 210/103 |
| 4,033,880 A | | 7/1977 | Bengtsson .................. 210/424 |
| 4,183,812 A | * | 1/1980 | Rosaen et al. |
| 4,191,648 A | | 3/1980 | Kaplan et al. .............. 210/186 |
| 4,204,965 A | * | 5/1980 | Vincent |
| 4,367,144 A | * | 1/1983 | Peters et al. |
| 4,442,002 A | | 4/1984 | Morris ........................ 210/411 |
| 4,486,304 A | | 12/1984 | Neuman et al. ............. 210/107 |
| 4,734,188 A | | 3/1988 | Burdette, Jr. et al. ....... 210/107 |
| 5,215,658 A | * | 6/1993 | Luby |
| 5,453,194 A | | 9/1995 | Klein .......................... 210/411 |
| 5,593,578 A | * | 1/1997 | Bryan et al. |
| 5,672,269 A | | 9/1997 | White ......................... 210/130 |
| 5,683,578 A | | 11/1997 | Zook et al. ................. 210/175 |
| 5,706,982 A | | 1/1998 | Siddiqui et al. ......... 222/146.5 |

FOREIGN PATENT DOCUMENTS

| | | | |
|---|---|---|---|
| JP | 05-245313 A | * | 9/1993 |
| JP | 09-010515 A | * | 1/1997 |

* cited by examiner

Primary Examiner—Thomas M. Lithgow
(74) Attorney, Agent, or Firm—Wood, Herron & Evans, LLP

(57) ABSTRACT

A spring-loaded filter assembly for a liquid dispenser is disclosed that permits ready removal of a filter element from a filter housing. The filter assembly includes the filter housing having a liquid inlet, a liquid outlet, and a liquid passageway between the inlet and outlet. An opening is affixed to the filter housing and is removably closed by a closure element. A filter element is positioned for movement within the filter housing between a filtering position and an access position. According to the present invention, a biasing member is positioned in the filter housing. When the closure element is removed from the opening, the biasing member is configured for urging the filter element from the filtering position to the access position for removing the filter element from the filter housing.

7 Claims, 2 Drawing Sheets

SPRING-BIASED FILTER ASSEMBLY

FIELD OF THE INVENTION

The present invention generally relates to filter assemblies and, more specifically, to filter assemblies used in viscous liquid dispensing systems.

BACKGROUND OF THE INVENTION

Viscous liquids are applied by dispensers onto a surface of a substrate in a variety of dispensing applications employed in the manufacture of products and product packaging. These viscous liquids include thermoplastic materials such as hot melt adhesives. Liquid dispensers utilize pneumatically or electrically actuated valve assemblies for metering a precise quantity of the viscous liquid and discharging the metered amount through a small-diameter dispensing orifice. Many thermoplastic materials exist in a solid form at room or ambient temperature and must be heated to create a flowable viscous liquid. Typically, the solid form of material is placed in a holding tank having heated walls and is melted by heating the solid material above its melting point. The viscous liquid is pumped in a molten state under pressure from the holding tank through a supply conduit to a manifold block. The manifold block has liquid passageways connected in fluid communication with the dispensing orifice of one or more liquid dispensers.

Under certain operating conditions, particles can accumulate in the viscous liquid and cause the liquid dispenser to periodically become clogged or fail. For example, to meet the demand of certain high-capacity dispensing operations, the holding tank must store a substantial volume of the viscous liquid and maintain the stored volume within a desired range of operating temperatures. This prolonged exposure to heat in an oxygen-containing environment may cause at least a portion of the viscous liquid to char, oxidize, or otherwise degrade. These conditions produce solidified, insoluble particles that admix with and contaminate the liquid.

The viscous liquid may also be contaminated by particles generated by the manufacturing operations associated with the liquid dispensing operation. If the holding tank is open to the surrounding environment or if a sealed holding tank is opened to add solid thermoplastic material, airborne particles or fibers can fall into the exposed liquid in the tank. Foreign debris that does not dissolve in the liquid will be pumped to the liquid dispenser.

Continuous operation of the liquid dispenser is contingent upon maintaining an unobstructed fluid pathway for the viscous liquid. Particulate contamination in the supply of viscous liquid can disrupt the operation of the liquid dispenser. The dispensing orifice of the liquid dispenser usually defines the maximum tolerable particle size. Particles that lodge in the dispensing orifice can either totally or partially occlude the flow of viscous liquid to the substrate. Particles may also become trapped between the valve and valve seat of the valve assembly and disrupt the metering of precise amounts of viscous liquid. To ensure that the flow of viscous liquid to the liquid dispenser is uninterrupted and that the desired amount of liquid is administered to the substrate, the liquid passageway of the manifold block typically incorporates a filter element. Viscous liquid flowing through the liquid passageway is directed through the filter element, which has a porosity calculated to remove at least the particles of the maximum tolerable size or larger.

When the filter element becomes clogged, the dispensing operation is interrupted to remove the filter element from the manifold block for cleaning or replacement. The downtime of the adhesive dispensing operation associated with the removal, replacement and/or cleaning, and reinstallation of the filter element results in lost productivity. If the filter element is difficult to remove or reinstall, the servicing downtime further reduces productivity. Both result in additional downtime and lost productivity. Perhaps the most significant impact of a time delay in servicing the filter element is that the viscous liquid in the holding tank remains static and exposed to an oxidizing atmosphere. This further increases particulate contaminants generated by the degrading liquid.

If a filter element is difficult to remove from the manifold block, maintenance personnel may be reluctant to replace or clean the filter element. If the filter element is not regularly serviced in anticipation of the progressive clogging, the system operating pressure will gradually increase. Eventually, the increase in operating pressure may damage either the liquid dispenser or other sensitive components of the dispensing system.

Thus, an improved filter assembly for a liquid dispenser is needed having a configuration that readily permits rapid removal and reinstallation of the filter element from the manifold block.

SUMMARY OF THE INVENTION

The present invention provides a filter assembly for a viscous liquid dispensing system that overcomes the drawbacks of previous systems as described above. The invention is particulary directed to overcoming problems associated with the removal of the filter element from the fluid passageway of a filter housing or manifold block containing the filter assembly. To that end, the filter element of the filter assembly is resiliently biased with a biasing member that provides a compressive force to urge the filter element from a filtering position in the fluid passageway toward an access position near an opening in the filter housing.

According to the present invention, a filter assembly for filtering a liquid includes a filter housing having a liquid inlet, a liquid outlet, and a liquid passageway communicating with the liquid inlet and the liquid outlet. The filter housing also has an opening that communicates with the liquid passageway. A removable closure element is affixed to the filter housing to selectively open and close the opening. A filter element is positioned for movement between two positions within the filter housing. In a filtering position, the filter element removes particles from the liquid flowing through the liquid passageway. In an access position, the filter element can be removed from the opening. A first biasing member is positioned in the filter housing and configured to urge the filter element from the filtering position to the access position, after the closure element is removed, to allow the filter element to be removed from the filter housing.

The present invention also includes a method for inserting and removing a filter element from a filter housing having a liquid inlet, a liquid outlet, and a liquid passageway communicating with the liquid inlet and liquid outlet. The method includes placing the filter element through an opening in the filter housing and into a filtering position within the liquid passageway and sealing the opening. The filter element is biased in a direction toward the opening with a first biasing force while filtering particles from liquid flowing within the liquid passageway. When the opening is unsealed, the filter element moves from the filtering position to an access position for removing the filter element.

The filter assembly of the present invention permits simplified and convenient access for removing the filter element from the filter housing. The filter assembly minimizes the downtime associated with the removal, replacement and/or cleaning of the filter element for optimizing the productivity of the liquid dispensing operation. Because of the convenient access, maintenance personnel will be more likely to regularly service the filter element so that progressive clogging will not significantly increase the operating pressure of the liquid dispensing system.

These and other objects, advantages, and features of the invention will become more readily apparent to those of ordinary skill in the art upon review of the following detailed description of the preferred embodiments, taken in conjunction with the accompanying drawings.

DETAILED DESCRIPTION OF THE DRAWINGS

DETAILED DESCRIPTION OF THE PREFERRED EMBODIMENTS

According to the present invention, a filter assembly for use with a liquid dispensing module permits simplified and convenient access for removing the filter element. The spring-biasing incorporated into the filter assembly minimizes the downtime associated with the removal, replacement and/or cleaning of the filter element and thereby optimizes the productivity of the liquid dispensing operation. It will be appreciated that the present invention may be applied to various apparatus operable for dispensing liquids.

Figure 1:
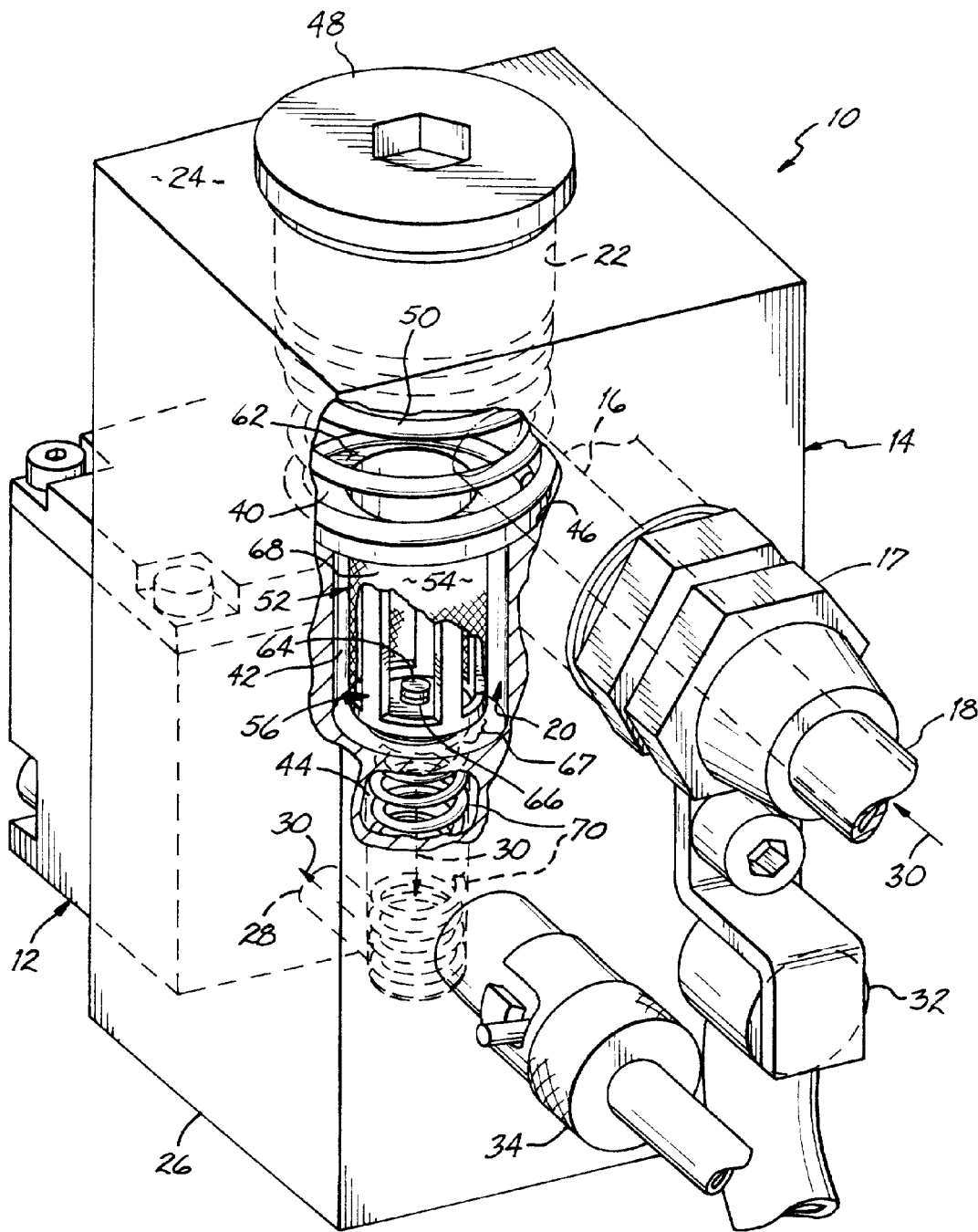
FIG. 1 is a partially cut away perspective view of a liquid dispensing unit incorporating a spring-biased filter assembly.

Referring to FIG. 1, a liquid dispensing module according to the present invention is indicated generally by reference numeral 10. Liquid dispensing module 10 comprises a dispensing valve 12 removably attached to a filter housing or manifold block 14. The dispensing valve 12 receives a filtered liquid from the manifold block 14 and in turn dispenses or applies the filtered liquid to a substrate. The dispensing valve 12 includes an internal valve assembly 76 (FIG. 3) that may be pneumatically or electrically actuated to dispense controlled quantities of liquid.

For the purpose of the present discussion, the liquid dispensing module 10 is described in connection with the dispensing of a heated liquid, such as thermoplastic materials used as hot melt adhesives. Hot melt adhesives are those polymeric materials which are normally solid at room or ambient temperature but, when heated, are converted to a liquid state. Hot melt adhesives are supplied to manifold block 14 at pressures ranging from about 200 p.s.i. to about 1200 p.s.i. and at a temperature between about 250° F. and about 350° F. In this temperature range, the viscosity of the liquified hot melt adhesive ranges between about 700 and about 100,000 centipoise, typically about 2,000 to about 50,000 centipoise. It is understood that the present invention is believed to be equally applicable for use in connection with the dispensing of a variety of other liquids which normally are fluidic at room or ambient temperature.

With reference to FIG. 1, the manifold block 14 has a liquid supply inlet 16 coupled for fluid communication via a fluid connector 17 with a supply conduit 18. Supply conduit 18 provides a flow of liquid to dispensing module 10 from a remote liquid supply source (not shown), such as a heated holding tank. Liquid inlet 16 is connected for fluid communication with a liquid passageway 20. Passageway 20 has an opening 22 in an outside surface 24 of manifold block 14 and an opposed closed end 26. A liquid outlet 28 is provided adjacent the closed end 26. Liquid outlet 28 supplies filtered liquid from passageway 20 to the dispensing valve 12. Arrows 30 generally trace the flow path of the liquid from the supply conduit 18 through the interior of the manifold block 14 and the interior of the dispensing valve 12. Although discussed herein in association with manifold block 14, the present invention is applicable to any filter housing having a filter element in a liquid passageway and an opening communicating with the liquid passageway for permitting access to the filter element from the exterior of the filter housing.

A heating device 32 and a temperature sensor 34 are attached to an exterior surface of manifold block 14 and may include probe elements (not shown) which extend into the interior of the manifold block 14. Heating device 32 and temperature sensor 34 are operably coupled to control circuitry (not shown) for maintaining a desired elevated temperature of the liquid during its passage through the liquid dispensing module 10. Suitable temperature sensors 34 are resistance temperature detectors (RTD's) or thermocouples. In most applications involving the dispensing of a heated viscous liquid, supply line 18 will likewise be warmed by heating elements (not shown) to compensate for heat loss as the liquid travels from the liquid supply source to the liquid dispensing module 10.

Liquid passageway 20 takes the form of a stepped, cylindrical bore comprising an upper duct 40 having a relatively large diameter, a filter chamber 42 of an intermediate diameter, and a lower duct 44 having a relatively small diameter. Upper duct 40 extends from the entrance of opening 22 to an annular shoulder 46 formed by the convergence of the upper duct 40 and the filter chamber 42. Opening 22 removably receives a plug or closure element 48 in a sealing engagement. In the embodiment illustrated in FIG. 1, upper duct 40 includes an internally threaded section and closure element 48 comprises a threaded cylindrical body having an externally threaded section removably threaded into the internally threaded section of opening 22. However, it is understood that upper duct 40 and closure element 48 may have an alternative mating configuration at their common interface effective for providing a sealing engagement without departing from the spirit and scope of the present invention. For reasons detailed below, an upper biasing member 50 is provided within a portion of upper duct 40.

A filter element 52 is removably provided in a filtering position within an interior portion of the filter chamber 42 of liquid passageway 20. Filter element 52 comprises an outer mesh screen 54 that is circumferentially wrapped about an exterior surface of an inner support frame 56. The sieve openings in the mesh screen 54 allow the passage of liquid flowing in liquid passageway 20 but are adapted to trap any debris or solid particulate material carried by the liquid larger than a maximum tolerable particle. Support frame 56 comprises a plurality of axial supports 58 that extend between an annular flange 60 and an end plate 62. The annular flange 60 has an outer diameter that is slightly smaller than the diameter of upper duct 40, yet larger than the diameter of the annular shoulder 46, and an inner diameter adapted for receiving a flow of unfiltered liquid from upper duct 40. Mesh screen 54 has a bore diameter chosen to slidingly fit over the exterior surface of the support frame 56. A fastener 64 secures the mesh screen 54 to a threaded opening 66 provided in the end plate 62. Mesh screen 54 has an outer diameter slightly less than an inner diameter of filter chamber 42 to create a space for receiving a flow of filtered liquid. Filtered liquid exits the filter chamber 42 to lower duct 44 through an annular gap 67.

The mesh screen 54 is preferably fabricated from a metal, such as a stainless steel, and preferably comprises a single sieve sheet 68 wrapped into a cylinder and welded or otherwise joined at the seam. In one embodiment, mesh screen 54 is a 50×50 mesh made from 0.009 inch diameter stainless steel wire in which the rectangular openings measure 0.012 inch by 0.012 inch. The support frame 56 is preferably fabricated from a strong, lightweight metal, such as an aluminum alloy. It is understood that filter element 52 is not limited in structure to the disclosed configuration and may comprise other filter elements familiar to those of ordinary skill in the art.

When filter element 52 is in a filtering position, the annular flange 60 is biased toward a sealing engagement against the annular shoulder 46 due to a compressive force applied by the upper biasing member 50. The closure element 48 impresses a predetermined amount of compressive force upon upper biasing member 50. The upper biasing member 50 elastically transfers that compressive force in a downward direction to the filter element 52. Preferably, the stiffness of upper biasing member 50 is chosen such that the compressive force applied to filter element 52 provides a sealing engagement between a sealing surface of annular flange 60 and a sealing surface of annular shoulder 46. The nature of the sealing engagement prevents significant amounts of unfiltered liquid from bypassing the filter element 52 by flowing between the sealing surfaces of the annular flange 60 and the annular shoulder 46.

As illustrated in FIG. 1, upper biasing member 50 is preferably a cylindrical coil spring having a characteristic stiffness and an outer diameter selected to fit within the interior of upper duct 40. It is understood that other types of biasing members could be substituted for upper biasing member 50 without departing from the spirit and scope of the present invention. In a compressed state, adjacent coils of upper biasing member 50 are spaced such that liquid entering liquid inlet 16 can pass into the upper duct 40 of liquid passageway 20 while encountering minimal fluid resistance. Furthermore, upper biasing member 50 is positioned in upper duct 40 such that the upper biasing member 50 does not inhibit or interfere with the flow of liquid in upper duct 40 to filter element 52. In certain embodiments, upper biasing member 50 may be omitted from the filter assembly and closure element 48 may directly contact filter element 52.

According to the present invention, a lower biasing member 70 is provided that, when compressed, is positioned in the lower duct 44 of liquid passageway 20 and abuts closed end 26. Lower biasing member 70 is preferably a cylindrical coil spring of a characteristic stiffness and having an outer diameter that fits within the interior of lower duct 44. When closure element 48 is affixed to manifold block 14, lower biasing member 70 applies a compressive force to filter element 52. The compressive force applied by the lower biasing member 70 to filter element 52 is selected to be less than the opposite compressive force applied by the upper biasing member to filter element 52. This mismatch in compressive forces ensures that, when filter element 52 is positioned in the filtering position within the liquid passageway 20, that the annular flange 60 of filter element 52 has a sealing engagement with the annular shoulder 46. When lower biasing member 70 is compressed, adjacent coils are separated so that the liquid can flow relatively unimpeded by significant fluid resistance from liquid passageway 20 into liquid outlet 28. When closure element 48 is removed from opening 22, lower biasing member 70 expands to urge filter element 52 toward the access position. The free length of lower biasing member 70 is chosen such that the filter element 52 is easily removed from the opening 22 of liquid passageway 20 when in the access position. Lower biasing element 70 and upper biasing member 50 are preferably formed of a corrosion resistant material, such as a stainless steel, and are generally aligned with the central axis of liquid passageway 20.

Figure 2:
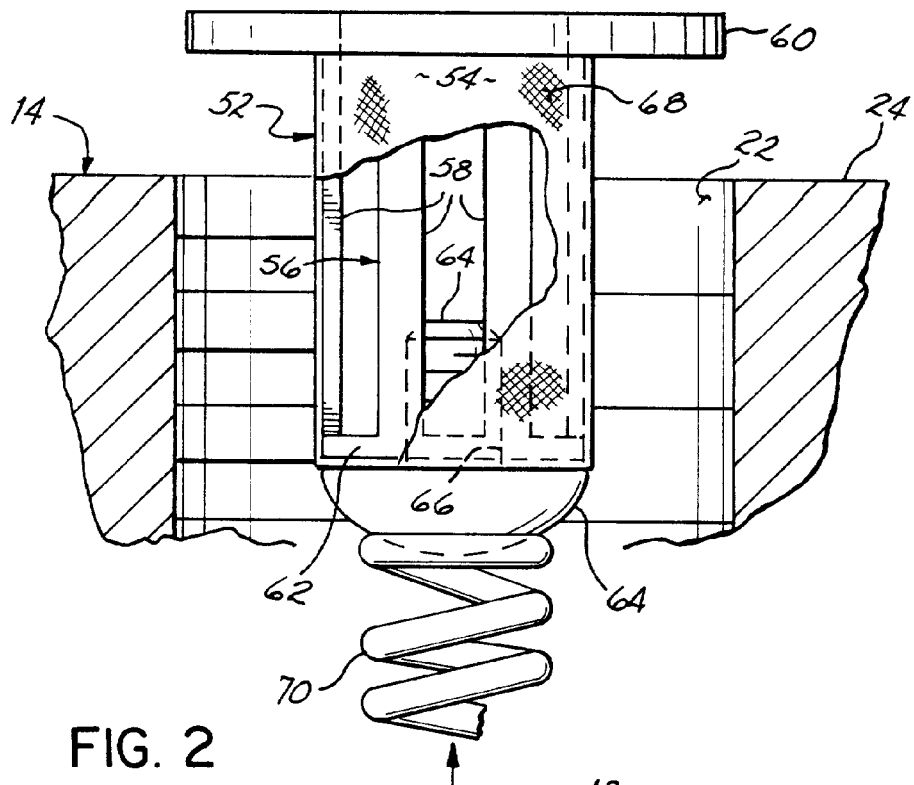
FIG. 2 is an enlarged view in partial cross section of the filter element and the manifold block of FIG. 1.

To remove the filter element 52 from manifold block 14 for replacement or cleaning, the pressurized flow of liquid is discontinued through the liquid inlet 16 of the manifold block 14, such as by valving the supply conduit 18. A suitable tool is used to loosen and remove the closure element 48 from the opening 22. According to the present invention, as closure element 48 is removed, the lower biasing member 70 decompresses by expanding to its free length. The filter element 52 is resiliently urged by the compressive force applied by lower biasing member 70 from the filtering position to the access position near the opening 22. The upper biasing member 50 likewise decompresses as closure element 48 is removed. As shown in FIG. 2 with the upper biasing member 50 already removed, the filter element 52 occupies the access position adjacent the upper surface 24 of the manifold block 14. According to the present invention, the filter element 52 can be easily removed from the liquid passageway 20 when positioned in the access position. After removal, the filter element 52 may be either cleaned or replaced with a new filter element.

To reinstall a cleaned filter element 52 or to install a new filter element, the lower biasing member 70 is inserted into the liquid passageway 20. Next, the filter element 52 is inserted through the opening 22 into the passageway 20 and contacts the upper coil of the lower biasing member 70. The upper biasing member 50 is then positioned above filter element 52. Closure element 48 is positioned axially above and in contact with upper biasing element 50. Closure element 48 is moved to compress upper biasing element 50 and lower biasing element 70. When properly positioned in the opening 22, closure element 48 is threadingly installed into the threaded portion of the upper duct 40. A suitable tool is used to apply an amount of torque to closure element 48 sufficient to create a sealing engagement between annular flange 50 of filter element 52 and annular shoulder 46. Following insertion and tightening, closure element 48 also provides a sealing engagement with opening 22 and filter element 52 occupies the filtering position within passageway 20. The flow of liquid through manifold block 14 is then restored.

Figure 3:
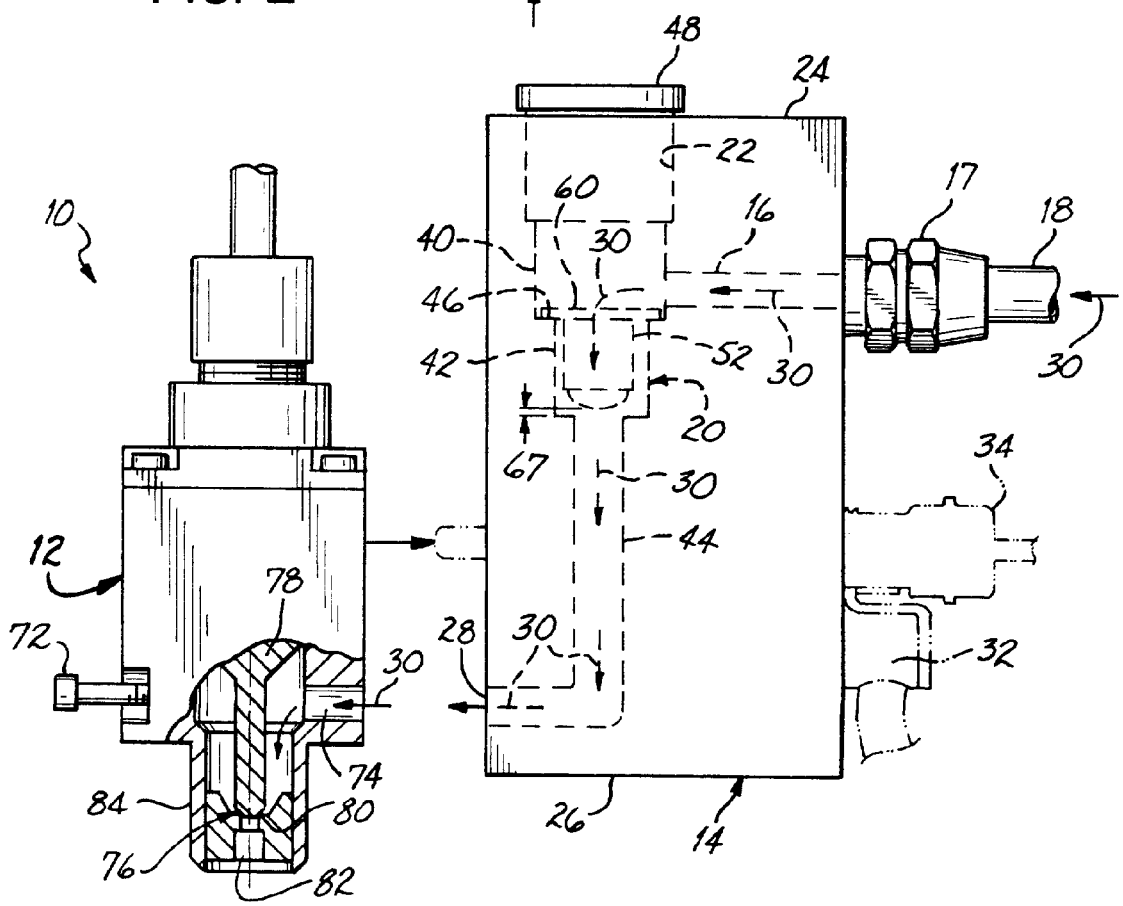
FIG. 3 is a partially cut away elevational view of a partially disassembled liquid dispensing unit of FIG. 1.

Referring to FIG. 3, dispensing valve 12 is removably mounted to the manifold block 14 by fasteners 72. Liquid outlet 28 of manifold block 14 supplies liquid that has been filtered by filter element 52 to a liquid passageway 74 provided in the dispensing valve 12. The dispensing valve 12 includes an internal valve assembly 76 comprising a moveable valve member 78 and a valve seat 80. Valve member 78 may be pneumatically or electrically actuated to selectively engage or disengage the valve seat 80 for dispensing controlled or metered quantities of liquid to a substrate (not shown). When valve assembly 76 is actuated, liquid flows through an annular gap between the valve member 78 and the valve seat 80 and is dispensed or applied from an orifice 82 in a nozzle 84. It will be appreciated that manifold block 14 may be larger and may carry multiple dispensing valves 12.

While the present invention has been illustrated by a description of various preferred embodiments and while these embodiments have been described in considerable detail in order to describe the best mode of practicing the invention, it is not the intention of applicant to restrict or in any way limit the scope of the appended claims to such detail. Additional advantages and modifications within the spirit and scope of the invention will readily appear to those skilled in the art. The invention itself should only be defined by the appended claims, wherein we claim:

What is claimed is:

1. A filter assembly for filtering a liquid comprising:
    a manifold block having a liquid inlet, a liquid outlet, and a liquid passageway communicating with said liquid inlet and said liquid outlet, said manifold block further having an opening communicating with said liquid passageway and said liquid passageway having an annular step portion with a first sealing surface;
    a closure element removably affixed to said opening to selectively open and close said opening:
    a filter element positioned for movement within said liquid passageway between a filtering position in which said filter element removes particles from the liquid flowing from said liquid inlet to said liquid outlet and an access position in which said filter element can be removed from said opening, said filter element having an annular flange with a second sealing surface;
    a first biasing member positioned in said manifold block and configured to urge said filter element from said filtering position to said access position after removal of said closure element to allow said filter element to be removed from said manifold block; and
    a second biasing member positioned between said filter element and said opening, said second biasing member urging said filter element in an opposite direction relative to said first biasing member to place said filter element into said filtering position when said closure element is affixed to said manifold block, said first and said second sealing surfaces being urged into a substantially fluid-tight engagement when said closure element is affixed to said opening.

2. The filter assembly of claim 1, wherein said second biasing member applies greater force to said filter element than said first biasing member when said closure element is affixed to said opening.

3. The filter assembly of claim 1, wherein said first and second biasing members are axially aligned.

4. The filter assembly of claim 1, wherein said first biasing member is positioned in said liquid passageway between said liquid inlet and said liquid outlet.

5. The filter assembly of claim 1, wherein said second biasing member is positioned in said liquid passageway between said liquid inlet and said liquid outlet.

6. The filter assembly of claim 1, wherein said first biasing member is a coil spring.

7. The filter assembly of claim 6, wherein said second biasing member is a coil spring.

* * * * *

UNITED STATES PATENT AND TRADEMARK OFFICE
CERTIFICATE OF CORRECTION

PATENT NO. : 6,406,625 B1
DATED : June 18, 2002
INVENTOR(S) : Brock et al.

It is certified that error appears in the above-identified patent and that said Letters Patent is hereby corrected as shown below:

<u>Column 7,</u>
Line 24, delete ":" and insert therefor --, and said liquid inlet is located between the closure element and said annular step portion and said liquid outlet is located on the opposite side of the annular step portion from said liquid inlet; --.

Signed and Sealed this

Seventeenth Day of December, 2002

JAMES E. ROGAN
*Director of the United States Patent and Trademark Office*